US011142173B2

(12) United States Patent
DeVault et al.

(10) Patent No.: US 11,142,173 B2
(45) Date of Patent: Oct. 12, 2021

(54) SYSTEM AND METHOD FOR COLLISION PREVENTION

(71) Applicant: The United States as Represented by the Secretary of Agriculture, Washington, DC (US)

(72) Inventors: Travis L. DeVault, Aiken, SC (US); Thomas W. Seamans, Norwalk, OH (US); Bradley F. Blackwell, Huron, OH (US)

(*) Notice: Subject to any disclaimer, the term of this patent is extended or adjusted under 35 U.S.C. 154(b) by 37 days.

(21) Appl. No.: 16/668,253

(22) Filed: Oct. 30, 2019

(65) Prior Publication Data

US 2021/0129807 A1 May 6, 2021

(51) Int. Cl.
| | | |
|---|---|---|
| *B60T 7/06* | (2006.01) | |
| *B60R 21/09* | (2006.01) | |
| *B62D 21/15* | (2006.01) | |
| *B62D 25/08* | (2006.01) | |
| *B60Q 1/52* | (2006.01) | |
| *B60Q 7/00* | (2006.01) | |
| *G05G 1/32* | (2008.04) | |
| *B60R 21/00* | (2006.01) | |

(52) U.S. Cl.
CPC ............... *B60T 7/065* (2013.01); *B60Q 1/52* (2013.01); *B60Q 7/00* (2013.01); *B60R 21/09* (2013.01); *B62D 21/152* (2013.01); *B62D 25/082* (2013.01); *G05G 1/32* (2013.01); *B60R 2021/0004* (2013.01)

(58) Field of Classification Search
CPC ..... B60T 7/065; B62D 21/152; B62D 25/082; B60R 21/09; B60R 2021/0004; G05G 1/32; B60Q 1/52; B60Q 7/00
See application file for complete search history.

(56) References Cited

U.S. PATENT DOCUMENTS

| | | | | |
|---|---|---|---|---|
| 3,813,143 | A | 5/1974 | Hubbs | |
| 4,091,383 | A * | 5/1978 | Rainville | A01M 29/18 340/384.2 |
| 4,150,637 | A * | 4/1979 | Penick | A01M 29/18 116/22 A |
| 4,437,428 | A * | 3/1984 | Hoffelner | A01M 29/18 116/137 R |
| 4,736,907 | A * | 4/1988 | Steffen | B64D 45/00 244/1 R |
| 4,998,091 | A * | 3/1991 | Rezmer | A01M 29/18 340/384.2 |
| 5,418,518 | A * | 5/1995 | Schenken | A01M 29/18 116/22 A |
| 5,939,987 | A | 8/1999 | Kram | |
| 5,969,593 | A * | 10/1999 | Will | A01M 29/10 119/174 |

(Continued)

*Primary Examiner* — John Fitzgerald
*Assistant Examiner* — Tania Courson (57) ABSTRACT

A vehicle frontal illumination system includes a bracket attached to a front of a vehicle, where the bracket includes a light receiving surface that faces the front of the vehicle. The system also includes one or more lights attached to the light receiving surface of the bracket such that the one or more lights face the front of the vehicle. The system further includes a control system in communication with the light, where the control system is configured to turn the one or more lights on to illuminate the front of the vehicle to reduce the likelihood of an animal vehicle collision.

20 Claims, 8 Drawing Sheets

(56) References Cited

U.S. PATENT DOCUMENTS

| | | | |
|---|---|---|---|
| 6,351,908 B1 | 3/2002 | Thomas | |
| 6,940,424 B2 * | 9/2005 | Philiben | B64D 47/06 |
| | | | 340/945 |
| 7,042,340 B2 | 5/2006 | Ewert | |
| 7,106,180 B1 * | 9/2006 | Pompei | A01M 29/18 |
| | | | 340/384.7 |
| 7,337,750 B2 | 3/2008 | Drake | |
| 7,370,601 B1 * | 5/2008 | Williams | A01M 29/16 |
| | | | 116/137 R |
| 7,575,348 B2 * | 8/2009 | Hasegawa | B60Q 1/143 |
| | | | 362/464 |
| 7,971,827 B2 * | 7/2011 | Barrientos | F02C 7/055 |
| | | | 244/121 |
| 8,616,144 B2 * | 12/2013 | Yifrach | A01M 31/002 |
| | | | 116/22 A |
| 8,997,680 B2 * | 4/2015 | Gardner | A01M 29/16 |
| | | | 116/22 A |
| 10,220,959 B2 * | 3/2019 | Khawam | B64D 47/06 |
| 10,321,672 B2 * | 6/2019 | Ronning | A01M 29/10 |
| 10,351,258 B1 * | 7/2019 | Barnes | A01M 29/10 |
| 10,501,074 B2 * | 12/2019 | Meier | A01M 29/10 |
| 10,709,127 B2 * | 7/2020 | Ronning | B64D 45/00 |
| 2010/0134271 A1 | 6/2010 | Edwards | |
| 2010/0192834 A1 * | 8/2010 | Fogiel | A01M 29/16 |
| | | | 116/22 A |
| 2010/0201525 A1 * | 8/2010 | Bahat | A01M 29/10 |
| | | | 340/573.2 |
| 2010/0270427 A1 * | 10/2010 | Barrientos | F02C 7/055 |
| | | | 244/1 R |
| 2014/0261151 A1 * | 9/2014 | Ronning | A01M 29/10 |
| | | | 116/22 A |
| 2015/0010399 A1 * | 1/2015 | Bahat | F03D 80/00 |
| | | | 416/1 |
| 2016/0029615 A1 * | 2/2016 | Newcamp | B64D 45/00 |
| | | | 119/713 |
| 2016/0366875 A1 * | 12/2016 | Green | A01M 29/18 |

\* cited by examiner

SYSTEM AND METHOD FOR COLLISION PREVENTION

BACKGROUND

Collisions between wildlife and manmade equipment (e.g., vehicles, airplanes, windmills, etc.) are an ongoing problem that results in injury, loss of life (both human and wildlife), and property damage. As an example, over 1 million deer-vehicle collisions occur each year on roads in the United States. In addition to personal injury and death, these vehicular collisions with deer result in over $4 billion in damages annually. Other common collisions involve birds colliding with airplanes, birds colliding with windmill blades, other animals (e.g., moose, caribou, bear, dogs) colliding with vehicles, etc.

SUMMARY

An illustrative vehicle frontal illumination system includes a bracket attached to a front of a vehicle, where the bracket includes a light receiving surface that faces the front of the vehicle. The system also includes one or more lights attached to the light receiving surface of the bracket such that the one or more lights face the front of the vehicle. The system further includes a control system in communication with the one or more lights, where the control system is configured to turn the one or more lights on to illuminate the front of the vehicle to reduce the likelihood of an animal vehicle collision.

An illustrative method for illuminating the front of a vehicle includes mounting one or more lights to a front of the vehicle such that the one or more lights face the front of the vehicle. The method also includes controlling, by a control system in communication with the one or more lights, the one or more lights to illuminate the front of the vehicle to reduce the likelihood of an animal vehicle collision.

An illustrative vehicle with a frontal illumination system includes a vehicle body that has a front surface. The vehicle also includes one or more lights mounted to the front surface such that the one or more lights are configured to emit light onto the front surface of the vehicle body. The vehicle also includes a control system in communication with the one or more lights. The control system is configured to turn the one or more lights on to illuminate the front surface of the vehicle body to reduce the likelihood of an animal vehicle collision.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Most deer-vehicle collisions occur at dusk and night during low-light conditions when only headlights of oncoming vehicles are visible (i.e., the rest of the car cannot be seen). The systems and methods described herein utilize onboard lighting to illuminate a frontal surface of the vehicle such that a large portion of the vehicle is visible to deer and other wildlife on or near the road. By illuminating the front of the vehicle, it has been shown that drivers would experience fewer potentially hazardous interactions with deer. While it is difficult to determine why the system is effective from the perspective of the deer, it is believed that the deer are more likely to perceive the vehicle as an oncoming threat due to the greater surface area looming towards them. Additionally, using the proposed system may help the deer recognize the oncoming object as a vehicle, rather than an unknown object represented only by two small points of light.

Regardless of the mechanism by which deer and other animals respond, field research indicates that the proposed system is effective in reducing potentially hazardous animal-vehicle interactions. To conduct the field tests, a pickup truck utilizing the proposed system approached free-ranging deer (standing on the road surface or within 3 m of the road edge) at night over 22 nights. A pickup truck was also driven without using the proposed system. Across 62 vehicle approaches towards deer (31 using the proposed system and 31 without), it was found that hazardous deer-vehicle interactions were reduced from 35.5% (11 of 31) without frontal vehicle illumination to 9.7% (3 of 31) with frontal vehicle illumination.

While conducting the aforementioned research, hazardous vehicle interactions were defined as those for which the flight initiation distance (FID) of deer (i.e., the distance between the deer and the vehicle when the deer initiated an avoidance behavior) in response to the approaching vehicle (always traveling at 60 kilometers/hour (km/h)) was less than 50 meters (m). The distance of 50 m was used as the threshold because previous research indicates that drivers are unlikely to see deer at night on or near roads when greater than 50 m away. Additionally, road design recommendations assume that driver Stopping Sight Distance (perception plus braking distance) exceeds 50 m for common vehicle speeds (i.e., those greater than 40 km/h). Thus, deer with FIDs greater than 50 m are unlikely to be hazardous to drivers because in those cases deer flee from the road before they come into view of the driver. In other words, the driver would not know that deer were present.

It is noted that for the conducted field research, infrared cameras were used to locate deer at distances up to several hundred meters before performing vehicle approaches. The deer with FIDs<50 m were considered to be potentially hazardous because, as noted above, data indicate drivers are unlikely to successfully brake in time to avoid them. Also, for many automobile accidents involving deer, the deer are never struck. In those cases, crashes are caused by drivers swerving to avoid deer and colliding with other cars or stationary objects. Thus, all interactions with deer on or near roads<50 m from moving automobiles can be considered hazardous.

Referring still to the field tests, it is noted that for 10 of the 11 hazardous vehicle approaches encountered without frontal vehicle illumination, the deer showed no flight initiation (i.e., FID=0). Instead, these deer exhibited the well-known behavior of 'freezing in the headlights.' In contrast, there was only one instance of a deer freezing in response to the vehicle with frontal vehicle illumination. Thus, it was shown that frontal vehicle illumination reduced potentially hazardous vehicle interactions by a factor of 3.7, primarily by greatly reducing the freezing (immobility) behavior of deer when a vehicle was approaching. The proposed system therefore causes the deer to move out of harm's way before becoming visible to a driver on most occasions.

Figure 1A:
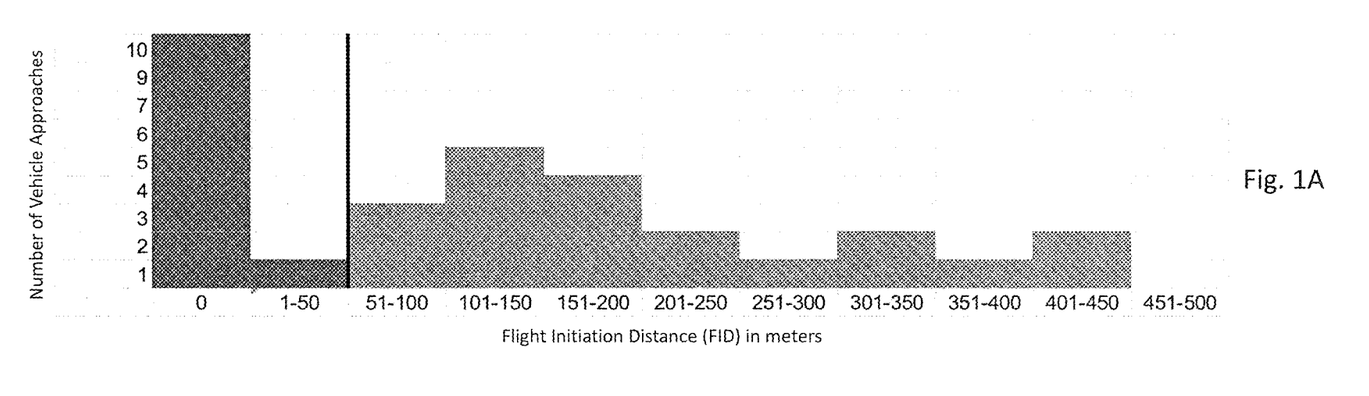
FIG. 1A is a chart depicting field testing results for a vehicle that is not equipped with a frontal illumination system in accordance with an illustrative embodiment.
Figure 1B:
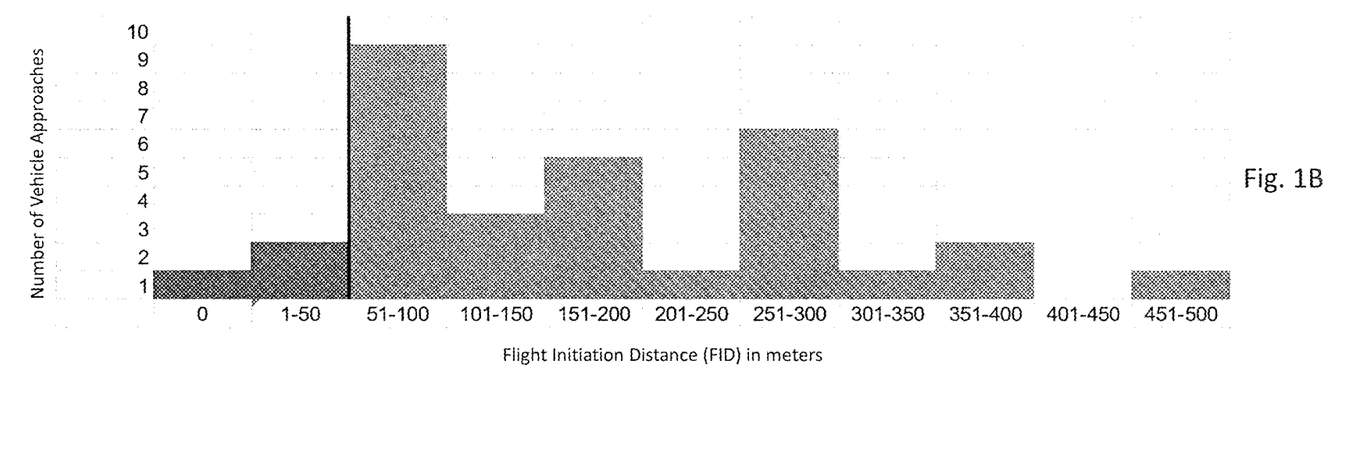
FIG. 1B is a chart depicting field testing results for a vehicle that is equipped with a frontal illumination system in accordance with an illustrative embodiment.

FIG. 1A is a chart depicting field testing results for a vehicle that is not equipped with a frontal illumination system in accordance with an illustrative embodiment. FIG. 1B is a chart depicting field testing results for a vehicle that is equipped with a frontal illumination system in accordance with an illustrative embodiment. In FIGS. 1A and 1B, the x-axis represents the flight initiation distance in meters, and the y-axis represents the number of vehicle approaches for which deer reacted at a given distance. The vehicle approaches to the left of the vertical black line in the charts (i.e., FID<50 m) represent potentially hazardous interactions. It can be seen from FIGS. 1A and 1B that the number of potentially hazardous vehicle-deer interactions was substantially reduced for the vehicle that included the proposed system as compared to the vehicle that did not.

Figure 2:
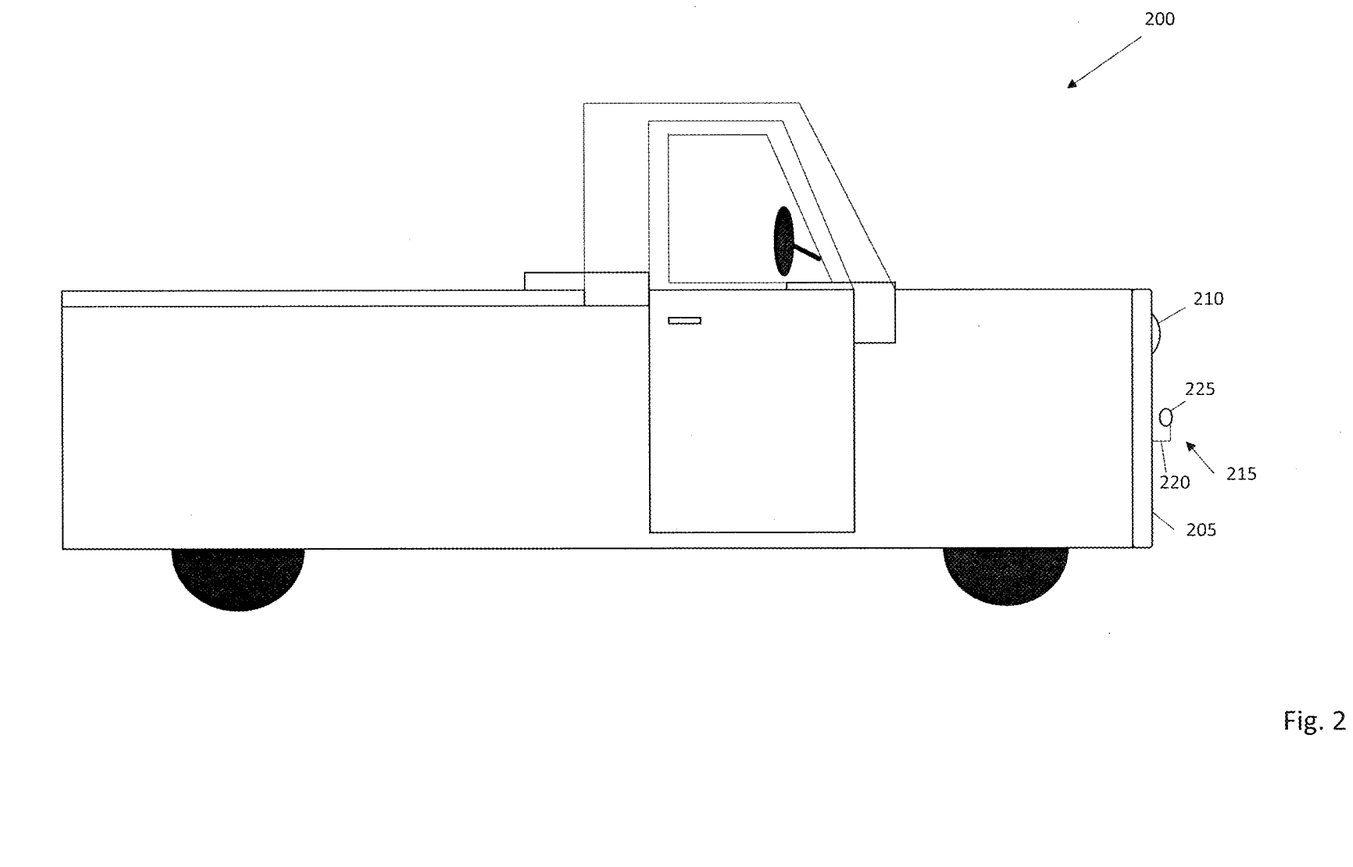
FIG. 2 is a side view of a vehicle equipped with a frontal illumination system in accordance with an illustrative embodiment.

FIG. 2 is a side view of a vehicle 200 equipped with a frontal illumination system 215 in accordance with an illustrative embodiment. While the vehicle depicted is a pickup truck, it is to be understood that the systems and techniques described herein are applicable to any type of vehicle, including trucks, cars, campers, semis, dump trucks, all-terrain vehicles, motorhomes, trains, etc. As discussed with reference to FIGS. 7-8, the proposed system can also be used with windmills and aircraft. The vehicle 200 includes a grille 205, through which headlights 210 are mounted. In an illustrative embodiment, the grille 205 is one or more vented panels that cover the front of the vehicle 200 such that the radiator and/or motor of the vehicle 200 are not readily visible. In alternative embodiments, the front of the vehicle may not include a grille. The headlights 210 (only one of which is visible in the side view of FIG. 2) can be standard headlights that are used to illuminate the area in front of the vehicle 200 so that the driver can see and be seen during low light conditions. The vehicle 200 also includes a frontal illumination system 215, that includes a bracket 220 and a light 225 mounted to the bracket 220.

The bracket 220 of the frontal illumination system 215 can be an L-shaped bracket, as depicted in FIG. 2. In alternative embodiments, a different type of bracket may be used, such as U-shaped, straight, T-shaped, etc. The bracket 220 includes a light receiving surface (i.e., the vertical portion of the bracket 220 shown in FIG. 2) to which the light 225 is mounted such that the light 225 faces the grille. The bracket 220, which can include one or more pivot points for adjustability, can mount directly to the grille 205 in one embodiment. Alternatively, the bracket 220 can be mounted to a chassis of the vehicle, to the engine block of the vehicle, to the radiator of the vehicle, etc. so that the bracket 220 extends through the front grille 205. The bracket 220 can be mounted to the vehicle 200 via a weld, one or more fasteners, one or more straps, magnetic force, etc. The bracket 220 can be made from aluminum, stainless steel, carbon fiber, plastic, rubber, and/or any other material that is able to structurally withstand the forces imposed on the front of the vehicle as the vehicle is driven.

In an illustrative embodiment, the bracket 220 is used to position the light 225 such that the light 225 illuminates the front of the vehicle. The bracket can thus position the light 225 at a distance in front of the vehicle 200, where the distance can be 0.25 inches, 0.5 inches, 0.75 inches, 1 inch, 2 inches, etc. The bracket 220 may also be adjustable such that the distance of the light from the front of the vehicle (or grille) can be adjusted depending on the vehicle type, grille type, user preferences, etc. While FIG. 2 depicts the bracket sticking out in front of the vehicle for illustrative purposes, it is to be understood other positions/configurations may be used. For example, the bracket 220 can be mounted flush or substantially flush with the front of the vehicle. The bracket 220 can also be mounted at various positions on the front of the vehicle 200, such as in the center of the front grille 205, on an upper portion of the front grille 205, on a lower portion of the front grille 205, or on a side of the front grille 205. Also, in some embodiments, a bracket may not be used, and the frontal illumination light(s) can be mounted directly to the grille or other area at the front of the vehicle. In other embodiments, the frontal illumination system 215 can include a plurality of brackets and corresponding lights mounted to the front of the vehicle to increase frontal illumination. Alternatively, in some embodiments, the system can include a single bracket to which a plurality of lights are mounted. As discussed in more detail below, in some embodiments, the light 225 can be incorporated into the frame of the vehicle 200 during manufacturing. In such an embodiment, a bracket may not be used.

The light 225 can include one or more light-emitting diodes (LEDs) that are positioned to illuminate the front of the vehicle. Alternatively, any other type of light may be used, such as halogen lights, fluorescent lights, etc. The light 225 can be hardwired to a power source of the vehicle, such as the battery of the vehicle. The light 225 may also receive power independent of the vehicle by way of a local battery. In an illustrative embodiment, the light 225 can be controlled (i.e., turned on/off) from an interior of the vehicle via a button, switch, or wireless signal. In some embodiments, the frontal illumination system may also include a low light sensor that is configured to automatically turn the light 225 on during low light driving conditions.

In some embodiments, the frontal illumination system 215 can also include an actuator to move the bracket 220 and/or the light 225. The actuator can be powered by the power system of the vehicle or by a local battery, depending on the implementation. The actuator can be used to position the light 225 relative to the front of the vehicle such that maximum frontal illumination is achieved. Alternatively, the light 225 may be statically mounted to the bracket 220, and the actuator can be used to move the bracket 220 to position the light 225. The actuator can also be used to extend and retract the bracket 220 such that the bracket 220 and light 225 are flush with or behind the front of the vehicle when the light 225 is not in use. When the light 225 is to be used, the actuator can extend the bracket 220 out in front of the vehicle as shown in FIG. 2. In an illustrative embodiment, the actuator can be controlled from an interior of the vehicle.

Figure 3A:
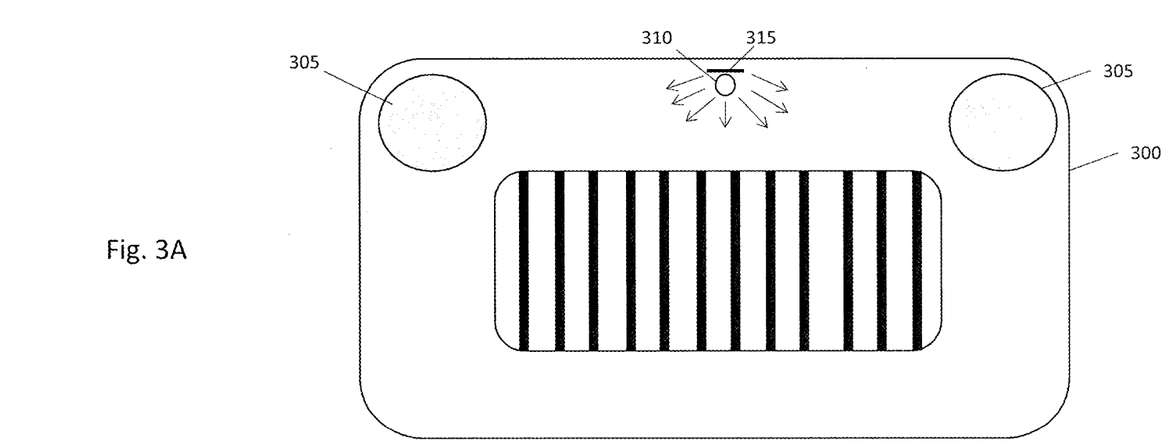
FIG. 3A is a front view of a vehicle grille with a frontal illumination system mounted thereon in accordance with a first illustrative embodiment.

FIG. 3A is a front view of a grille 300 with a frontal illumination system mounted thereon in accordance with a first illustrative embodiment. The frontal illumination system is mounted on an upper portion of the vehicle grille 300 in between headlights 305 of the vehicle. As shown, the frontal illumination system includes a light 310 and a reflector 315 mounted directly above the light 310. The frontal illumination system may also include a bracket to hold the light 310, a power source, an actuator, and/or a low light sensor as described above. In embodiments without a bracket, the light 310 can be mounted directly to the grille 300 or to any other component that is mounted to or that forms the front of the vehicle.

The light 310 can also be embedded during the vehicle manufacturing process into the frame, grille, hood, front fender(s), bumper, or other component positioned at the front of the vehicle. In an illustrative embodiment, the light(s) can thus be positioned such that they are not conspicuously visible from the outside of the vehicle unless they are turned on. As an example, the frame or other component of the vehicle can be molded, assembled, or otherwise built to include one or more light holders that are configured to hold one or more lights that illuminate the front of the vehicle. The one or more light holders can be openings and/or receptacles that are configured to house the one or more lights. One or more reflectors and/or shields can also be incorporated into the frame or other vehicle component during manufacturing. The reflector(s) can be mounted in a path of emitted light and used to reflect the emitted light to more fully illuminate the front of the vehicle. The shield(s) can be mounted in the path of the emitted light and used to block/absorb a portion of the emitted light.

In such an embodiment in which the light 310 is incorporated into the vehicle during manufacturing, the light 310 can be statically mounted or extendable/retractable, depending on the implementation. For example, in some embodiments, the light can be mounted to a retractable bracket that extends out from the front of the vehicle only while the light 310 is in use. In such an embodiment, the light 310 and bracket retract when the light 310 is turned off. In other embodiments, the light 310 can be statically mounted, and a movable cover that is incorporated into the front of the vehicle can be placed into an open position such that the light 310 illuminates the front of the vehicle or a closed position in which the movable cover covers the light 310 such that the light 310 is not visible. The light 310 can also be movable such that the angle with which emitted light contacts the front of the vehicle can be adjusted. In one embodiment, the light 310 can be mounted such that it is able move from a first position in which it illuminates the front of the vehicle to a second position in which it illuminates an area in front of the vehicle. In such an embodiment, the light 310 is able to rotate, pivot, or otherwise move over a range of angles that can be ~90°, 120°, 150°, 180°, 300°, etc. With the ability to illuminate both the front of the vehicle and an area in front of the vehicle, the light 310 can be used as a dual purpose light, such as a fog light or a frontal illumination light, depending on the conditions.

In embodiments where the light 310 is installed during manufacturing, the light 310 can also be wired directly into the power and computer systems of the vehicle, and one or more controls for the light 310 can be mounted on the vehicle dashboard or elsewhere in the vehicle interior. The one or more controls can include a light intensity control (e.g., dimmer switch), a light adjustment control that allows the position of the light 310 to be changed, an on/off switch, an ambient light sensor control that determines whether the light 310 turns on/off based on readings from the light sensor, etc.

In FIG. 3A, the arrows extending from the light 310 depict the general directions in which emitted light is directed from the system. As shown, the emitted light travels in downward and sideways directions to illuminate the grille 300. The reflector 315, which may not be included in some embodiments, is used to help direct the emitted light in the downward and sideways directions such that the light does not travel upward into the line of sight of the driver of the vehicle. The reflector 315 can be can be made from or coated with a reflective material to maximize the illumination. Alternatively, instead of a reflector, a light absorbing surface may be used as a light cover to block the emitted light in the upward direction.

Figure 3B:
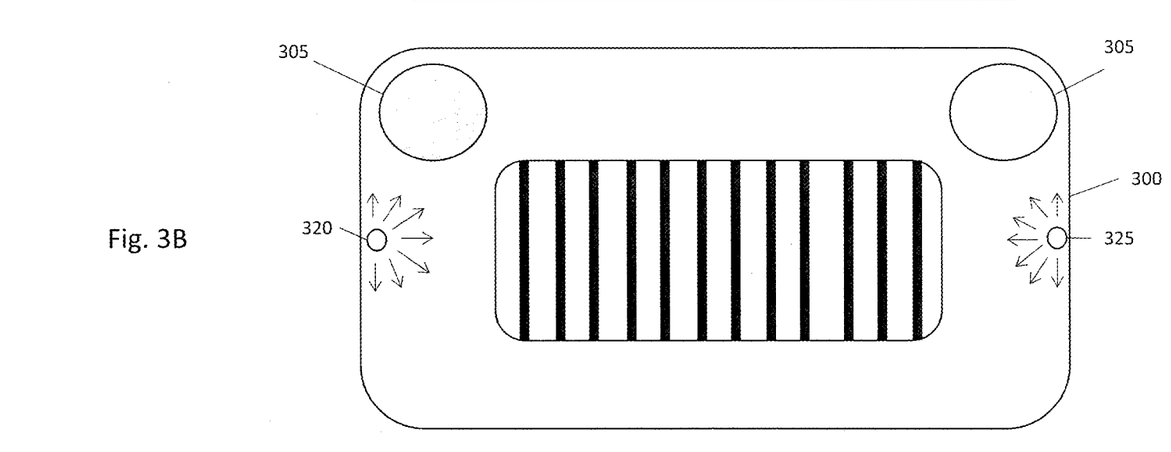
FIG. 3B is a front view of a vehicle grille with a frontal illumination system mounted thereon in accordance with a second illustrative embodiment.

In alternative embodiments, the frontal illumination system may be mounted on a different portion of the grille 300 such as the bottom portion or the side(s). Additionally, the frontal illumination system may include a plurality of lights positioned about the grille 300. FIG. 3B is a front view of the grille 300 with a frontal illumination system mounted thereon in accordance with a second illustrative embodiment. The frontal illumination system of FIG. 3B includes a first light 320 mounted on a passenger side of the grille 300 and a second light 325 mounted a driver side of the vehicle grille. Arrows extending from the first light 320 and the second light 325 show the general directions of emitted light. The first light 320 and the second light 325 can be mounted to the grille 300 via brackets (e.g., in an aftermarket embodiment), or as discussed above they can be embedded in the grille 300 or other vehicle component during manufacturing of the vehicle.

In an alternative embodiment, the frontal illumination system of FIG. 3B may include a single light (i.e., either the light 320 or the light 325). In another alternative embodiment, the frontal illumination system of FIG. 3B may include a single light and a reflector opposite the single light to increase the overall illumination. As an example, the light 320 may be a light and a reflector can be positioned on the grille 300 in place of the light 325 (or vice versa). The reflector can receive emitted light from the light 320 and reflect that emitted light back onto the grille 300, such that the reflector acts as a passive light source. In some embodiments, a single light source may be used with a plurality of reflectors positioned about the grille 300 to reflect the emitted light and more fully illuminate the front grille.

In another alternative embodiment, the frontal illumination system of FIG. 3B can include additional lights. For example, in addition to the first light 320 and the second light 325 mounted along the sides of the grille 300, the frontal illumination system may also include one or more additional lights mounted along the side(s), one or more additional lights mounted on an upper portion of the grille 300, and/or one or more additional lights mounted on a lower portion of the grille 300.

Figure 4:
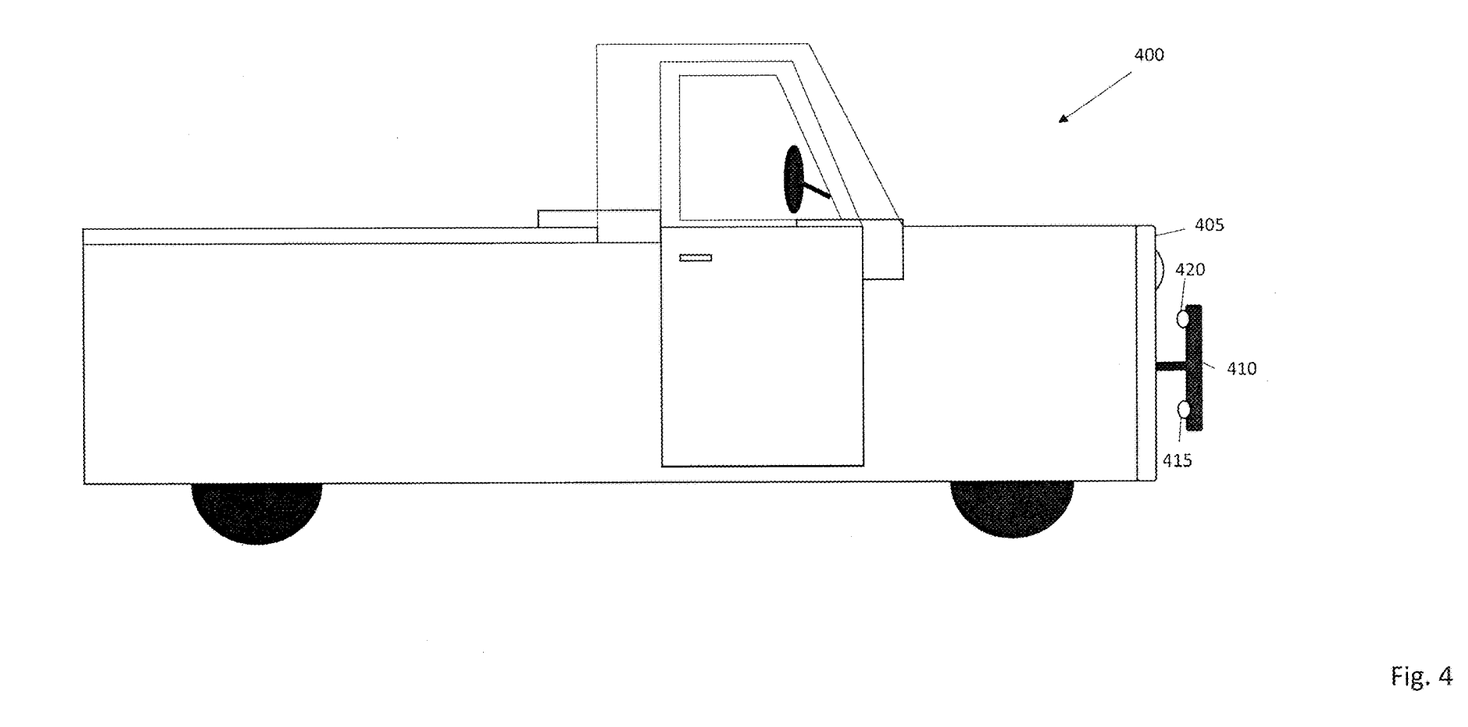
FIG. 4 is a side view of a vehicle with a frontal illumination system mounted to a rear surface of a front accessory in accordance with an illustrative embodiment.

FIG. 4 is a side view of a vehicle 400 with a frontal illumination system mounted to a rear surface of a front accessory 410 in accordance with an illustrative embodiment. The frontal illumination system includes a first light 415 and a second light 420 mounted to a rear surface of the front accessory 410 such that emitted light is directed toward a grille 405 of the vehicle 400. In some embodiments, the frontal illumination system of FIG. 4 can also include one or more brackets to which the lights are mounted, one or more actuators to control movement of the lights/brackets, one or more low light sensors to determine whether the lights should be on/off, a power source, etc. The front accessory 410 can be a brush guard, a bumper, a plow mount, a plow, a winch mount, a winch, or any other component that mounts to the front of the vehicle 400.

In alternative embodiments, fewer or additional rear facing lights may be mounted to the front accessory 410. In one embodiment, one or more light bars that each include a plurality of lights/bulbs can be mounted to the rear side of the front accessory 410 to illuminate the grille 405. In another embodiment, the light(s) (i.e., the light 415, the light 420, a light bar, etc.) may also be mounted on a top or bottom of the front accessory 410 and positioned to face the vehicle such that they illuminate the grille 405. In yet another embodiment, the light(s) may be mounted to the front accessory 410 using a bracket that allows the light(s) to rotate from a front facing orientation in which the light(s) work in conjunction with the headlights to improve the visibility for the driver to a rear facing orientation in which the light(s) illuminate the grille 405. In such an embodiment, the light(s) can be moved manually or via a powered actuator to control the orientation.

In another embodiment, in addition to the light 415 and the light 420, the frontal illumination system may also include one or more lights directed toward a front of the front accessory 410 such that the front accessory 410 is illuminated in addition to the grille 405. The one or more lights directed toward the front of the front accessory 410 can be mounted directly to the front of the front accessory 410 or to a bracket that extends outward from the front accessory 410, depending on the implementation. In yet another embodiment, the brush guard 410 can include one or more forward facing lights (e.g., fog lights) mounted thereon. In such an embodiment, one or more rear-facing lights can be mounted to a rear side of the housing(s) of the one or more forward facing lights to illuminate the grille 405. The embodiments of FIG. 4 can be implemented aftermarket or during manufacturing of the vehicle and/or vehicle accessories.

Figure 5:
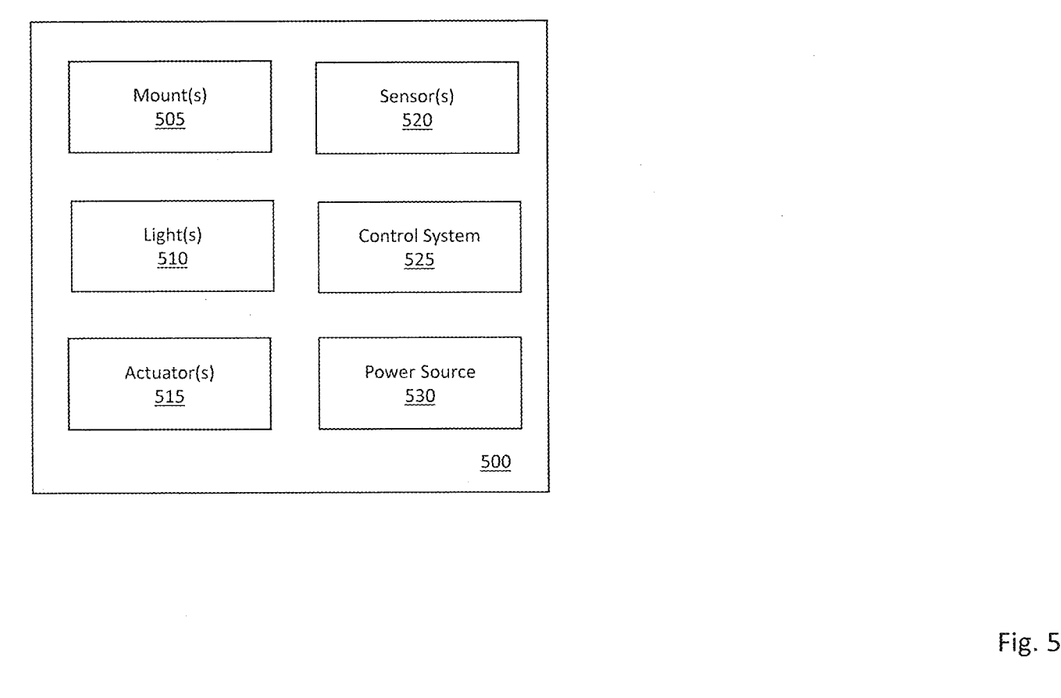
FIG. 5 is a block diagram of a frontal illumination system in accordance with an illustrative embodiment.

FIG. 5 is a block diagram of a frontal illumination system 500 in accordance with an illustrative embodiment. The frontal illumination system 500 includes one or more mounts 505, one or more lights 510, one or more actuators 515, one or more sensors 520, a control system 525, and a power source 530. In, alternative embodiments, the frontal illumination system 500 can include fewer, additional, and/or different components. For example, as discussed herein, in some embodiments, the frontal illumination system 500 may include one or more reflectors and/or light covers to help direct and/or block the light.

In some embodiments, the frontal illumination system 500 can be an aftermarket device that can be attached to any existing vehicle. In an aftermarket implementation, the one or more mounts 505 can include one or more brackets that attach to a vehicle and that are used to hold and position the one or more lights 510 such that the one or more lights 510 illuminate the front of the vehicle. The one or more brackets can mount to a front of the vehicle (e.g., a grille), to a brush guard or other item attached to the front of the vehicle (e.g., winch, bumper, grille cover, snow plow, snow plow mounting bracket, etc.). The one or more brackets can also attach to the engine block, chassis, radiation housing, or other component behind the grille. Alternatively, the one or more mounts 505 can be housing(s) for the one or more lights 510 that attach directly to the front of the vehicle. The one or more mounts 505 can also include fasteners, welds, solder, straps, magnets, etc. to secure the system to the vehicle.

Alternatively, the frontal illumination system 500 can be installed during the vehicle manufacturing process such that the one or more mounts 505 are integrated in the body of the vehicle. For example, the one or more mounts 505 can be openings or cavities in the front grille or front bumper of the vehicle that are configured to receive the one or more lights 510, which are then hardwired into the electrical system of the vehicle. In such an embodiment, the one or more mounts 505 can also include stationary or movable brackets that are integrated into the vehicle and configured to hold the one or more lights 510.

In an illustrative embodiment, the one or more lights 510 can be LED lights because of their brightness range and low power consumption. Alternatively, other types of lights may be used such as halogen, fluorescent, etc. In another illustrative embodiment, the one or more lights 510 can emit white light, and each light can emit the same wavelength of light. In alternative embodiments, a different wavelength of light may be used, such as red, green, yellow, etc. Additionally, in some embodiments, different lights can be configured to emit different wavelengths of light. The wavelength of light emitted by the one or more lights 510 can also be static or adjustable by the user, depending on the embodiment. The one or more lights 510 can all have the same intensity, or varying intensities. In one embodiment, the one or more lights 510 can include a plurality of intensity settings that can be selected by the user. For example, the user may be able to select from a low intensity setting, a medium intensity setting, and a high intensity (i.e., very bright) setting depending on the driving conditions.

The one or more actuators 515 can be electric motors, hydraulic cylinders, pneumatic actuators, piezoelectric actuators, and/or any other type of actuator known in the art. The one or more actuators 515, if present, are used to manipulate a position of the one or more mounts 505 and/or the one or more lights 510 to maximize illumination of the front of the vehicle. The one or more actuators 515 can also be used to extend and retract the one or more mounts 505 such that the system is visible while in use, and retracted (not visible) while not in use. The one or more actuators 515 can be controlled using the control system 525, which can include controls mounted on a dashboard or elsewhere in the interior of the vehicle. Alternatively, the one or more actuators 515 can be in wireless communication with a user device (e.g., cell phone, tablet, laptop, etc.) such that the user can control the one or more actuators 515 remotely via the user device. The one or more actuators 515 can also be controlled via controls that are locally positioned on the one or more mounts. In an alternative embodiment, the position of the one more mounts 505 and/or the one or more lights 510 can be manually adjusted by the user. In yet another embodiment, the one or more mounts 505 and/or the one or more lights 510 can be statically mounted such that they do not move relative to the vehicle.

The one or more sensors 520 can be low light sensors that are configured to detect low light conditions caused by nighttime, solar eclipse, fog, smoke, smog, etc. The low light sensors can be in communication with the control system 525 and used to determine when the one or more lights 510 should be turned on. For example, the one or more sensors 520 send a signal to the control system 525 to indicate that a low light condition has been detected. In response to the signal, the control system 525 can automatically turn the one or more lights 510 on. Similarly, the one or more sensors 520 can send a signal to the control system 525 indicating that a low light condition is no longer detected, which causes the control system 525 to turn the one or more lights 510 off. In an illustrative embodiment, the user may also be able to override the sensors and turn the one or more lights 510 on or off, regardless of the light condition detected by the one or more sensors 520.

In an alternative embodiment, sensors may not be used and the user can manually turn the one or more lights 510 on and off. In another alternative embodiment, the one or more lights 510 can be controlled in unison with the regular headlights of the vehicle such that the one or more lights 510 are on when the headlights are on (regardless of whether the headlights are turned on manually or automatically) and such that the one or more lights 510 are off when the headlights are off. In such an embodiment, the one or more lights 510 may also have a low intensity setting that is used when the regular headlights are on and a high intensity setting that is used when the 'brights' are on. Alternatively, the one or more lights 510 may have a single intensity setting that is activated whenever the regular or bright headlights are on.

In an illustrative embodiment, the control system 525 can be a computing system that is used to control the frontal illumination system 500. The control system 525 can be incorporated into the on-board computer of the vehicle, into a standalone user device (e.g., cell phone, tablet, etc.), and/or locally via controls positioned at the front of the vehicle (e.g., on a mount/housing for the lights). The control system 525 is described in more detail with reference to FIG. 6. The power source 530 is used to provide power to the one or more lights 510 such that the one or more lights 510 are able to emit light. The power source 530 can be the battery of the vehicle, or one or more separate dedicated batteries that are incorporated into the one or more mounts 505 or housings for the one or more lights 510.

Figure 6:
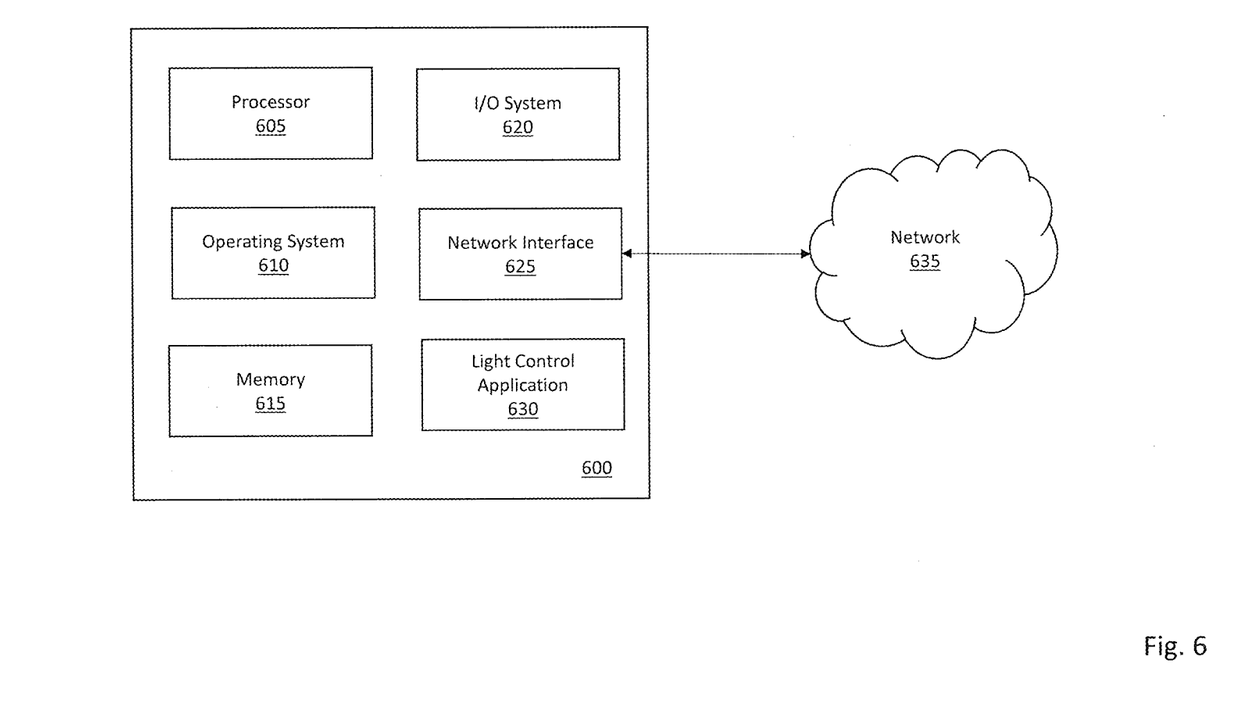
FIG. 6 is a block diagram of a control system for a frontal illumination system in accordance with an illustrative embodiment.

FIG. 6 is a block diagram of a control system 600 for a frontal illumination system in accordance with an illustrative embodiment. As discussed herein, the control system 600 can be (or be part of) the on-board computing system of the vehicle, a standalone control system associated with the frontal illumination system, or a user device. The control system 600 includes a processor 605, an operating system 610, a memory 615, an input/output (I/O) system 620, a network interface 1625, and a light control application 630. In alternative embodiments, the control system 600 may include fewer, additional, and/or different components. The components of the control system 600 communicate with one another via one or more buses or any other interconnect system.

The processor 605 can be used to implement commands received by the control system 600. For example, the processor 605 can be used to turn the lights on/off in response to a user command or a sensor reading. The processor 605 can also be used to control actuators of the frontal illumination system such that the lights can be moved, retracted, and/or positioned at a desired orientation. The processor 605 can be any type of computer processor known in the art, and can include a plurality of processors and/or a plurality of processing cores. The processor 605 can include a controller, a microcontroller, an audio processor, a graphics processing unit, a hardware accelerator, a digital signal processor, etc. Additionally, the processor 605 may be implemented as a complex instruction set computer processor, a reduced instruction set computer processor, an x86 instruction set computer processor, etc. The processor 605 is used to run the operating system 610, which can be any type of operating system.

The operating system 610 is stored in the memory 615, which is also used to store programs, user data, network and communications data, peripheral component data, the light control application 630, and other operating instructions. The memory 615 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. The memory 615 can include computer-readable instructions that, upon execution by the processor 605, cause any of the operations described herein to be performed.

The I/O system 620 is the framework which enables users and peripheral devices to interact with the control system 600. The I/O system 620 can include buttons, switches, a keyboard, one or more displays, a touchscreen, a speaker, a microphone, etc. that allow the user to interact with and provide instructions to the control system 600. The I/O system 620 also includes circuitry and a bus structure to interface with peripheral computing devices such as power sources, USB devices, data acquisition cards, peripheral component interconnect express (PCIe) devices, serial advanced technology attachment (SATA) devices, high definition multimedia interface (HDMI) devices, proprietary connection devices, etc.

The network interface 625 includes transceiver circuitry that allows the control system 600 to transmit and receive data to/from other devices such as remote computing systems, servers, websites, etc. The network interface 625 enables communication through a network 635, which can be one or more communication networks. The network 635 can include a cable network, a fiber network, a cellular network, a wi-fi network, a landline telephone network, a microwave network, a satellite network, etc. The network interface 625 also includes circuitry to allow device-to-device communication such as Bluetooth® communication.

The light control application 630 can include software in the form of computer-readable instructions which, upon execution by the processor 605, performs any of the various operations described herein for controlling and positioning the lights. In an alternative implementation, the light control application 630 can be remote or independent from the rest of the control system 600, but in communication therewith.

Figure 7A:
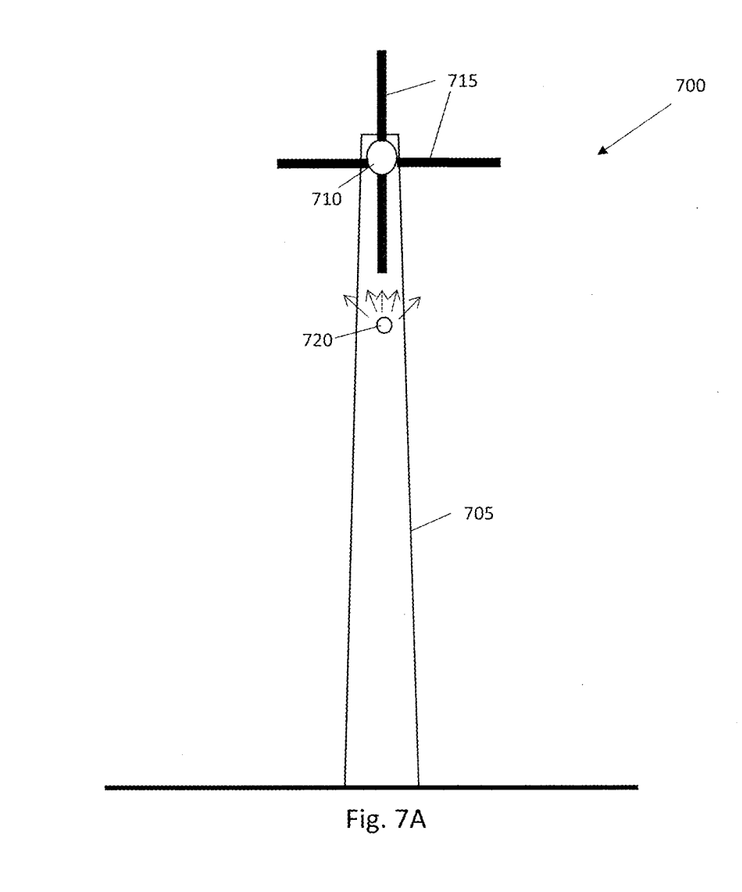
FIG. 7A is a front view of a windmill with an illumination system in accordance with an illustrative embodiment.
Figure 7B:
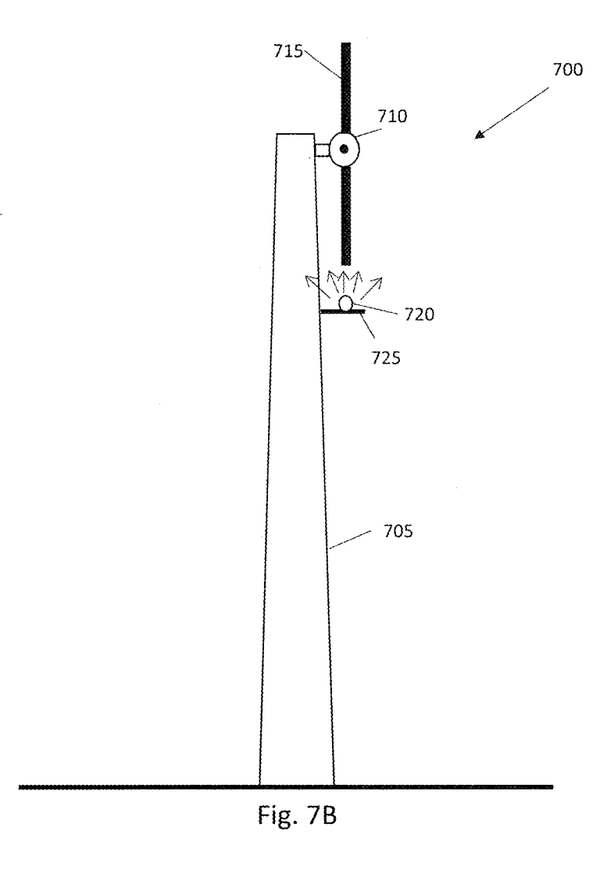
FIG. 7B is a side view of the windmill with the illumination system in accordance with an illustrative embodiment.

As discussed herein, the proposed illumination systems are not limited to ground vehicles. Additional applications include usage on windmills and aircraft. FIG. 7A is a front view of a windmill (or wind turbine) 700 with an illumination system in accordance with an illustrative embodiment. FIG. 7B is a side view of the windmill 700 with the illumination system in accordance with an illustrative embodiment. The windmill 700 includes a base 705, a rotor 710 that is rotationally mounted to the base 705, and a plurality of blades 715 mounted to the rotor 710. The illumination system of the windmill 700 includes at least a light 720 and a bracket 725 to which the light is mounted. Any type of bracket/mount described herein may be used. The illumination system can also include one or more additional brackets and/or lights, one or more actuators, one or more reflectors, a power system, a control system, etc. as described herein. Also, the illumination system can be installed aftermarket onto the windmill 700, or incorporated during manufacturing of the windmill 700 and/or its accessories.

Unlike a ground vehicle, a windmill does not translate/move laterally relative to the ground surface. Rather, the rotor 710 of the windmill 700 rotates in response to air current that impacts the blades 715. The blades 715 can be difficult for birds to see in low light conditions, and bird/blade collisions often result in the death of the bird and damage to the windmill. The illumination system is used to illuminate the blades during low light conditions so that they are more visible (and thus avoidable) to birds. Because the windmill 700 does not move laterally, blade/bird collisions can occur on both the front surfaces and the rear surfaces of the blades 715. Thus, in an illustrative embodiment, the illumination system is configured to illuminate both the front and the back of the blades 715, in at least some embodiments.

As depicted, the light 720 is mounted below the blades 715 and oriented such that emitted light is directed up toward the blade. The light 720 (which can be a plurality of lights), is positioned to illuminate both the front and back of the blades 715. In some embodiments, one or more lights are used to illuminate the front surfaces of the blades 715 and one or more lights are used to illuminate the rear surfaces of the blades 715. In alternative embodiments, the light 720 can be mounted above the blades such that the light shines downward onto the blades, or to the side(s) of the blades 715. The light 720 can also be mounted to the rotor 710 in some embodiments, or to the blades 715 themselves. In an illustrative embodiment, the illumination system mounted to the windmill 700 is remotely controlled such that the lights can be turned on/off and/or positioned remotely by a user via a user device or dedicated remote controller. The illumination system may also include one or more low light sensors to automatically turn the lights on/off depending on the light conditions.

Figure 8:
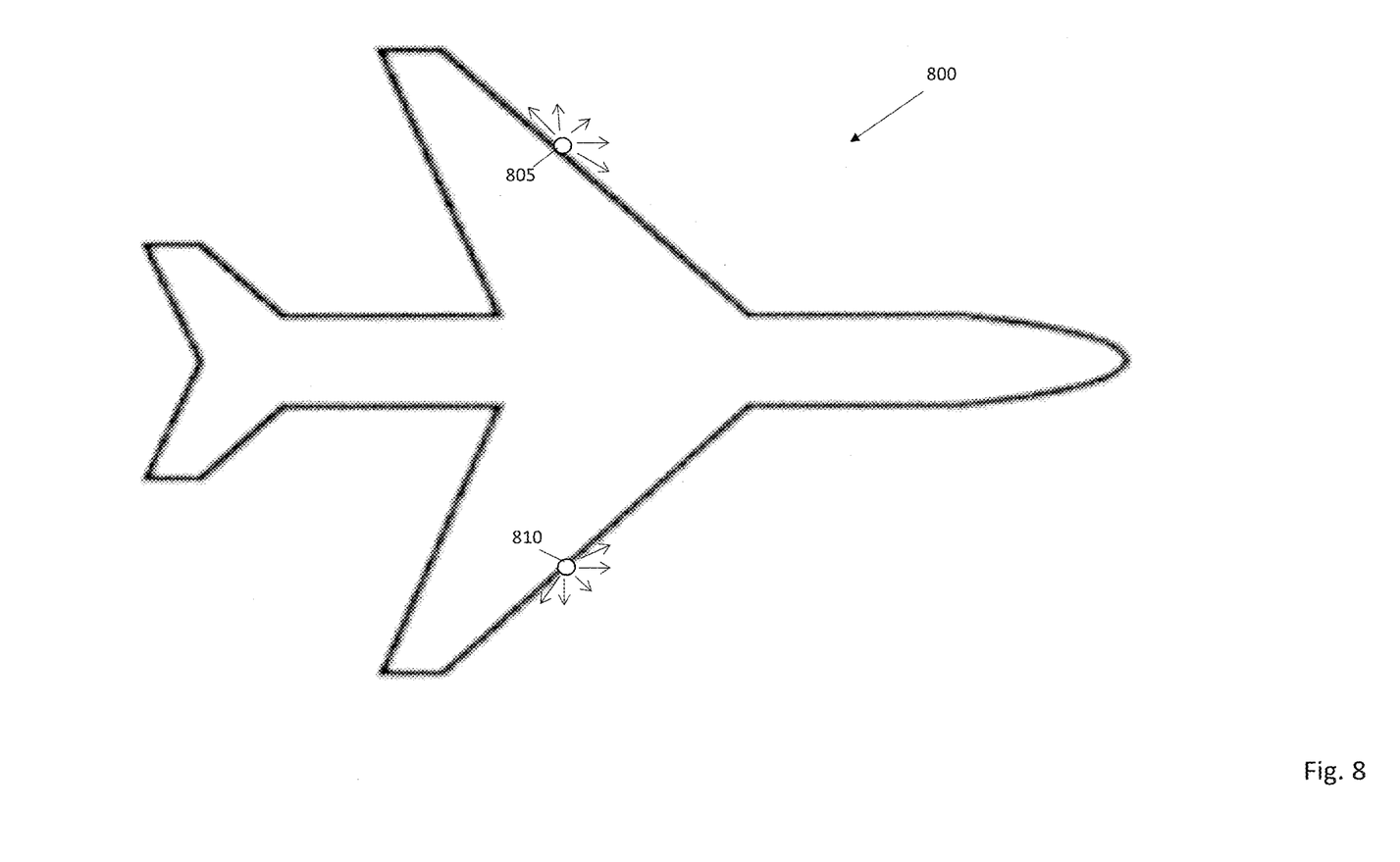
FIG. 8 is a top view of an airplane with a frontal illumination system in accordance with an illustrative embodiment.

FIG. 8 is a top view of an airplane 800 with a frontal illumination system in accordance with an illustrative embodiment. Although an airplane is depicted, the frontal illumination system can be used on any flying machine such as a helicopter, drone, hang glider, etc. The airplane 800 includes a light 805 mounted to a leading edge of a first wing, and a light 810 mounted to a leading edge of a second wing opposite the first wing. Each of the lights 805, 810 may be a plurality of lights, and the plurality of lights can be spread out along the leading edges of the wings. Emitted light from the lights 805, 810 is directed to illuminate the wings themselves and the front of the airplane 800 in an effort to reduce airplane/bird collisions. The lights 805, 810 can be incorporated into the wings during the manufacturing process, or added via brackets/mounts aftermarket. The lights 805, 810 can be controlled remotely (i.e., on/off or movement/positioning) from a cockpit of the airplane 800, and the frontal illumination system for the airplane 800 can also include any of the other components/functions described herein.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A vehicle frontal illumination system, comprising:
   a bracket attached to a front of a vehicle, wherein the bracket includes a light receiving surface that faces the front of the vehicle;
   one or more lights attached to the light receiving surface of the bracket such that the one or more lights face the front of the vehicle and illuminate the front of the vehicle to which the bracket is attached; and
   a control system in communication with the one or more lights, wherein the control system is configured to turn the one or more lights on to illuminate the front of the vehicle to reduce the likelihood of an animal vehicle collision.

2. The system of claim 1, further comprising one or more actuators configured to adjust an orientation of the one or more lights.

3. The system of claim 1, further comprising one or more actuators configured to move the bracket from a withdrawn position to an extended position.

4. The system of claim 3, wherein the one or more lights are hidden when the bracket is in the withdrawn position and visible when the bracket is in the extended position.

5. The system of claim 1, further comprising one or more reflectors mounted to the front of the vehicle, and positioned to receive light from the one or more lights and reflect the received light toward the front of the vehicle.

6. The system of claim 1, wherein the bracket is attached to a front accessory of the vehicle.

7. The system of claim 1, wherein the one or more lights include a first light mounted on a first side of the front of the vehicle and a second light mounted on a second side of the front of the vehicle.

8. The system of claim 1, wherein the front of the vehicle includes a grille, and wherein the bracket is mounted to the grille.

9. The system of claim 1, wherein the control system includes one or more low light sensors that are used to determine when to turn the one or more lights on.

10. A method for illuminating the front of a vehicle, the method comprising:
    mounting one or more lights to a front of the vehicle such that the one or more lights face the front of the vehicle and illuminate the front of the vehicle to which the one or more lights are mounted; and
    controlling, by a control system in communication with the one or more lights, the one or more lights to illuminate the front of the vehicle to reduce the likelihood of an animal vehicle collision.

11. The method of claim 10, further comprising:
    mounting a bracket to the front of the vehicle such that a light receiving surface of the bracket faces the front of the vehicle; and
    mounting the one or more lights to the bracket.

12. The method of claim 10, further comprising adjusting, by an actuator, an orientation of the one or more lights relative to the front of the vehicle.

13. The method of claim 10, further comprising determining, by the control system, whether to turn the one or more lights on based on received information from a low light sensor.

14. The method of claim 10, further comprising adjusting, by the control system, an intensity of the one or more lights.

15. The method of claim 10, further comprising adjusting, by the control system, a wavelength of light emitted by the one or more lights.

16. A vehicle with a frontal illumination system comprising:
 a vehicle body that includes a front surface;
 one or more lights mounted to the front surface such that the one or more lights are configured to emit light onto the front surface of the vehicle body to which the one or more lights are mounted; and
 a control system in communication with the one or more lights, wherein the control system is configured to turn the one or more lights on to illuminate the front surface of the vehicle body to reduce the likelihood of an animal vehicle collision.

17. The system of claim 16, wherein the one or more lights are embedded into one or more receptacles formed in the front surface of the vehicle.

18. The system of claim 16, further comprising one or more low light sensors configured to:
 detect a low light condition; and
 provide a signal to the control system indicating that the low light condition has been detected such that the control system turns on the one or more lights.

19. The system of claim 16, further comprising one or more actuators configured to adjust an orientation of the one or more lights.

20. The system of claim 16, further comprising one or more reflectors mounted to the front of the vehicle and positioned to receive light from the one or more lights and reflect the received light toward the front of the vehicle.

* * * * *